United States Patent
Baligh et al.

(10) Patent No.: US 8,817,723 B2
(45) Date of Patent: Aug. 26, 2014

(54) METHODS AND APPARATUS FOR INTER-CELL INTERFERENCE COORDINATION SELF-ORGANIZED NETWORK

(75) Inventors: Mohammadhadi Baligh, Ottawa (CA); Ying Qian, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 106 days.

(21) Appl. No.: 13/298,893

(22) Filed: Nov. 17, 2011

(65) Prior Publication Data

US 2012/0120893 A1   May 17, 2012

Related U.S. Application Data

(60) Provisional application No. 61/414,627, filed on Nov. 17, 2010.

(51) Int. Cl.
*H04W 4/00* (2009.01)
*H04W 72/00* (2009.01)

(52) U.S. Cl.
USPC .......................................... 370/329; 455/450

(58) Field of Classification Search
None
See application file for complete search history.

(56) References Cited

U.S. PATENT DOCUMENTS

| | | | | |
|---|---|---|---|---|
| 5,666,651 | A * | 9/1997 | Wang | 455/450 |
| 6,628,952 | B1 * | 9/2003 | Hankins et al. | 455/446 |
| 8,385,488 | B2 * | 2/2013 | Choi et al. | 455/312 |
| 2005/0012231 | A1 | 1/2005 | Olsson et al. | |
| 2005/0122231 | A1 * | 6/2005 | Varaiya et al. | 340/870.01 |
| 2008/0039129 | A1 * | 2/2008 | Li et al. | 455/522 |
| 2008/0198798 | A1 | 8/2008 | Wu et al. | |
| 2008/0207210 | A1 | 8/2008 | Brusch | |
| 2009/0092059 | A1 * | 4/2009 | Fu | 370/252 |
| 2009/0117911 | A1 * | 5/2009 | Molisch et al. | 455/450 |
| 2009/0170497 | A1 * | 7/2009 | Miao et al. | 455/422.1 |
| 2009/0323603 | A1 * | 12/2009 | Kwon et al. | 370/329 |
| 2010/0267408 | A1 | 10/2010 | Lee et al. | |
| 2010/0290413 | A1 * | 11/2010 | Kuwahara | 370/329 |
| 2011/0021224 | A1 * | 1/2011 | Koskinen et al. | 455/507 |
| 2011/0149879 | A1 * | 6/2011 | Noriega et al. | 370/329 |
| 2011/0183679 | A1 * | 7/2011 | Moon et al. | 455/450 |
| 2011/0205929 | A1 * | 8/2011 | Quek et al. | 370/329 |
| 2011/0222525 | A1 * | 9/2011 | Kishigami et al. | 370/343 |
| 2012/0015680 | A1 * | 1/2012 | Yang et al. | 455/517 |
| 2012/0122513 | A1 * | 5/2012 | Yang et al. | 455/522 |
| 2012/0207092 | A1 * | 8/2012 | Zirwas et al. | 370/328 |
| 2013/0079009 | A1 * | 3/2013 | Aumann et al. | 455/436 |

FOREIGN PATENT DOCUMENTS

TW   201032611 A1   9/2010

OTHER PUBLICATIONS

"Extended European Search Report," Application No. 11840949.9, Applicant: Huawei Technologies Co., Ltd., mailing date: Jan. 22, 2014, 8 pages.
International Search Report and Written Opinion of the International Searching Authority, International Application No. PCT/US 11/61264, 9 pages, Mar. 2, 2012.
"Taiwanese Office Action," Application No. 201180054632.0, mailing date: Mar. 24, 2014, 12 pages.
"Taiwanese Search Report," Application No. 2011800546320, mailing date: Mar. 11, 2014, 3 pages.

* cited by examiner

*Primary Examiner* — Gregory Sefcheck
*Assistant Examiner* — Joshua Smith
(74) *Attorney, Agent, or Firm* — Slater & Matsil, L.L.P.

(57) ABSTRACT

A method of resource allocation for use in a wireless network is disclosed. A network coloring decision to assign a plurality of resource blocks to a plurality of cells within the wireless network is triggered upon occurrence of a network event. A network coloring is performed by assigning each cell of the plurality of cells a resource block from the plurality of resource blocks. An effect of interference among adjacent cells with a same resource block assignment is reduced as measured by a network performance metric related to a number of resource block assignment conflicts over the plurality of cells.

26 Claims, 11 Drawing Sheets

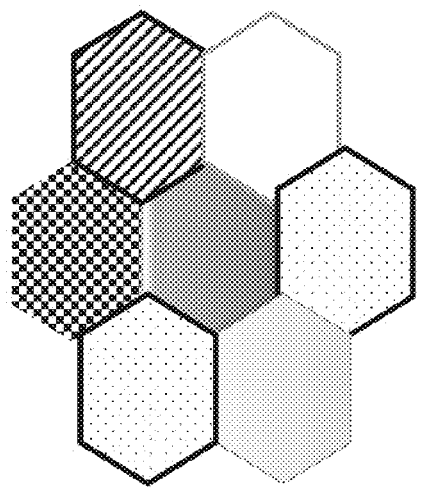
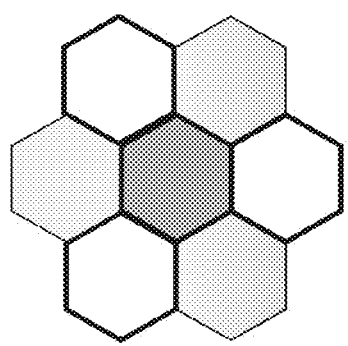
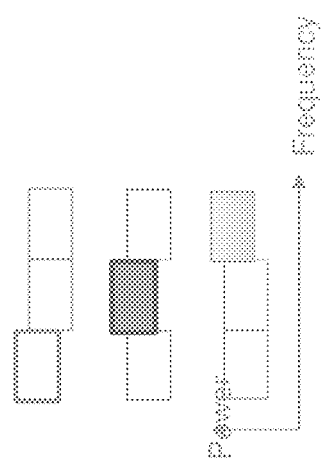
Figure 2(a)
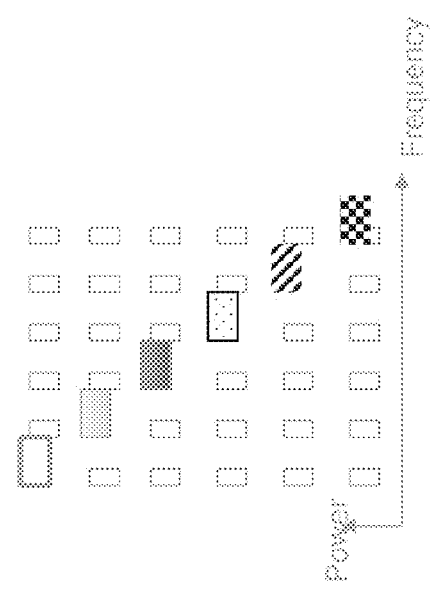
Figure 2(b)

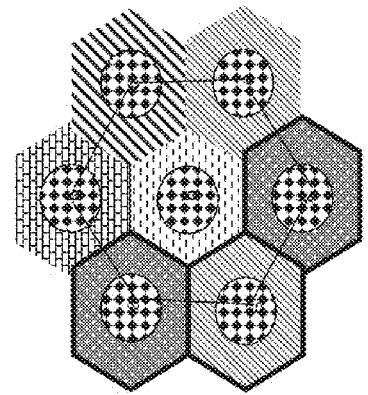
Figure 2(c)
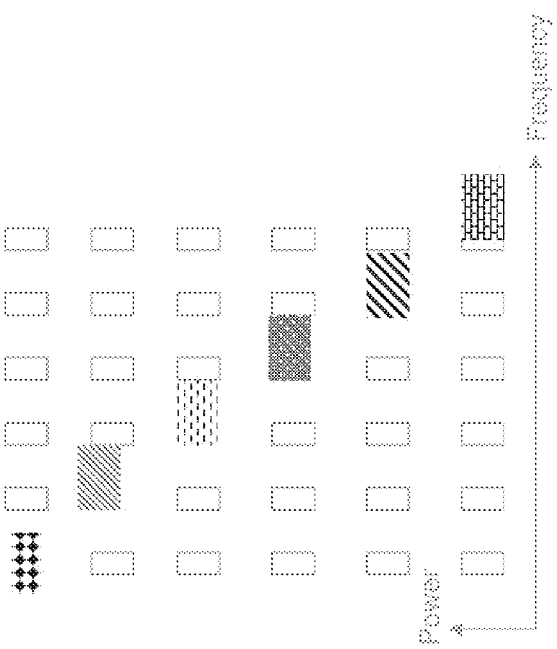
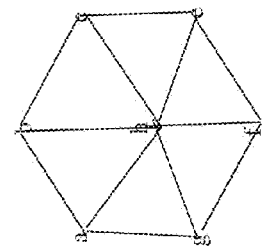
Figure 2(d)

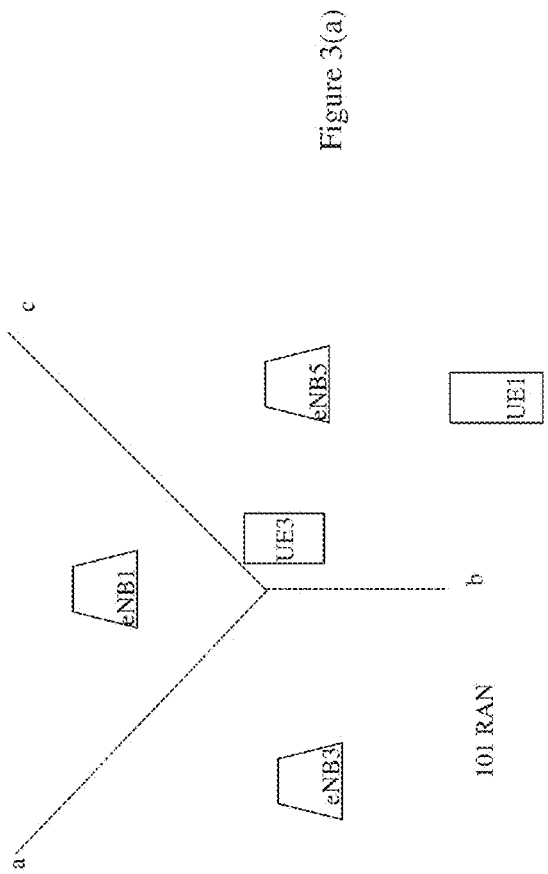

US 8,817,723 B2

METHODS AND APPARATUS FOR INTER-CELL INTERFERENCE COORDINATION SELF-ORGANIZED NETWORK

This application claims the benefit of U.S. Provisional Application Ser. No. 61/414,627, filed on Nov. 17, 2010, entitled "ICIC self-organized mode selection algorithm," which application is hereby incorporated herein by reference in its entirety.

TECHNICAL FIELD

Embodiments of the present invention relate to methods and apparatus for inter-cell interference coordination (ICIC) self-organized network, and fractional frequency reuse coloring algorithms.

BACKGROUND

The orthogonal frequency division multiple access (OFDMA) technology is important for many current communication systems such as Fourth generation (4G) mobile communication systems. These 4G systems target significantly higher sector capacities and higher per user data rates compared to third generation systems. Long Term Evolution (LTE) is one such 4G system and is an evolution of the 3rd Generation Partnership Project (3GPP) Universal Mobile Telecommunications System (UMTS) standard. Other 4G system may include the IEEE 802.16m or WiMAX. All these 4G systems may use air interface technologies based on the OFDMA. LTE uses OFDMA in the downlink (DL) and single carrier frequency division multiple access (SC-FDMA) in the uplink (UL) as the physical layer radio access technology.

In an OFDMA system, the time-frequency two-dimensional electric waves are composed of an Orthogonal Frequency Division Multiplex (OFDM) symbol in the time domain a frequency subchannel in the frequency domain. Each frequency subchannel is composed of a plurality of different subcarriers. In an OFDM symbol time interval, each user in the cell uses an orthogonal frequency subchannel. The OFDMA system is, therefore, free from intra-cell interference, which is an important characteristic of the OFDMA system.

When different cells or users use the same frequency subchannel for transmitting messages in the same time interval, an inter-cell interference (ICI) occurs. Thus, the link quality of the cell edge user degrades and the data throughput decreases, which are serious problems in an OFDMA system. In fact, ICI has been shown to be the predominant performance-limiting factor for wireless cellular networks. As a result, a significant amount of research has been devoted to developing inter-cell interference coordination (ICIC) techniques to reduce and manage the inter-cell interference.

SUMMARY OF THE INVENTION

These and other problems are generally solved or circumvented, and technical advantages are generally achieved, by embodiments of systems and methods for inter-cell interference coordination (ICIC) self-organized network, and fractional frequency reuse coloring algorithms.

In accordance with an example embodiment, a method for wireless network communication is provided. The method deals with self-organization of the network with respect to ICIC self-organized network. Instead of field measurement and manual planning, the network relies on the reports by the UEs in the system and uses automatic coloring. The method can also be used to find the color set, which are a set of resource blocks, for the field test measurements, especially as initial settings. The method works for downlink (DL) as well as uplink (UL) of a wireless network.

In accordance with an example embodiment, a method for wireless network communication is provided. The method manages a plurality of resource blocks for a wireless network, wherein a resource block comprises a frequency bandwidth, a time slot, or a power level of a signal. A coloring decision to assign the plurality of resource blocks to a plurality of cells within the network may be triggered based on a network event. The method then performs a network cell coloring by assigning each cell among the plurality of cells a resource block or a plurality of resource blocks from the plurality of resource blocks wherein an effect of interference among adjacent cells with a same resource block assignment is reduced measured by a network performance metric related to a number of resource block assignment conflicts over the plurality of cells.

In accordance with an example embodiment, a method for wireless network communication is provided. The method further informs and configures a plurality of base stations located in the plurality of cells the assigned resource blocks wherein a base station located in a cell among the plurality of cells operates in the assigned resource block in a manner for controlling the effect of interference among adjacent cells.

In accordance with an example embodiment, the method works for a plurality of cells, which may be a part of the network and each cell of the plurality of cells has a previously assigned resource block of the cell. The method also works for the coloring of the global network. The network coloring decision can be triggered by a network event comprising a cell addition, a cell deletion, a network change, a frequency band change, a periodic trigger, or a change of the network performance metric. The method may be performed by a network management system. The network performance metric may be a measurement of cell loading, cell edge loading, cell sizes, number of users, handover success rate, or user equipment (UE) signal to interference and noise ratio (SINR).

In accordance with an example embodiment, the method performs a network cell coloring by assigning each cell among the plurality of cells a resource block. The method may start from a first cell among the plurality of cells, and assigning a first resource block to the first cell. The method then determines among the plurality of cells which have not been assigned a resource block a first most sensitive cell to an interference caused by the first resource block assigned to the first cell, and assigns a most favorite resource block to the first most sensitive cell; wherein the first most sensitive cell and the most favorite resource block are measured by the network performance metric. The method further determines which cell that has not been assigned a resource block is a most sensitive cell remaining, the most sensitive cell remaining being most sensitive to interference caused by previously assigned resource blocks, and assigns a next most favorite resource block to the most sensitive cell remaining, wherein the most sensitive cell remaining and the next most favorite resource block are determined by measurement of the network performance metric. The method repeats the determining and assigning steps until each of the plurality of cells has been assigned a resource block.

In accordance with an example embodiment, the method performs a network cell coloring by assigning each cell among the plurality of cells a resource block, based on a network performance metric. The network performance metric is based on a network neighboring relation table (network NRT) maintained for the network, and the network NRT comprises a matrix of size of n*n, n is a number of the plurality of cells, an element $B_{ij}$ of the matrix is $B_{ij}=A_{ij}+A_{ji}$, $$A_{ij} = \frac{1}{N_i}\left(\sum_{k=1}^{N_i} A_{ij}^k\right)$$

is a metric indicates an interference from a cell j to a cell i, caused by the assigned resource block of the cell j measured by all UEs over a period of time in the cell i, $$A_{ji} = \frac{1}{N_j}\left(\sum_{k=1}^{N_j} A_{ji}^k\right)$$

is a metric indicates an interference from the cell i to the cell j, caused by the assigned resource block of the cell i measured by all UEs over a period of time in the cell j, each $A_{ji}^k$ and $A_{ij}^k$ are a measurement of an interference to an UE measured at a time.

In accordance with an example embodiment, the method performs a network cell coloring by assigning each cell among the plurality of cells a resource block, based on a network performance metric. The network performance metric may be built up using the following process. An UE in the cell i measures and reports a measurement of a reference signal receive power (RSRP) of the cell j, the result is $A_{ij}^k$. The base station located in the cell i receives the data $A_{ij}^k$ measured by an UE in the cell i, and maintains data $A_{ij}^k$ in the base station. The base station located in the cell i further maintains a base station NRT generated from a plurality of data $A_{ij}^k$ received from a plurality of UEs located in the cell i. The base station further reports the base station NRT to a network management system which generates the network NRT for the network, and the network management system determines to trigger the coloring decision based on the generated network NRT and a predetermined threshold for the network NRT.

In accordance with an example embodiment, an apparatus to manage a plurality of resource blocks for a wireless network is disclosed. The apparatus comprises a decision unit to receive a network event and determine a coloring decision to assign the plurality of resource blocks to a plurality of cells within the network based on the network event; and an assignment unit to receive a network performance metric and perform a network cell coloring by assigning each cell among the plurality of cells a resource block from the plurality of resource blocks, wherein an effect of interference among adjacent cells with a same resource block assignment is reduced measured by a network performance metric related to a number of resource block assignment conflicts over the plurality of cells.

In accordance with an example embodiment, an apparatus to manage a plurality of resource blocks for a wireless network is disclosed. The apparatus further comprises a network neighboring relation table (network NRT) maintained for the network, and the network NRT comprises a matrix of size of n*n, n is a number of the plurality of cells, an element $B_{ij}$ of the matrix is $$B_{ij} = A_{ij} + A_{ji}, A_{ij} = \frac{1}{N_i}\left(\sum_{k=1}^{N_i} A_{ij}^k\right)$$

is a metric indicates an interference from a cell j to a cell i, caused by the assigned resource block of the cell j measured by all UEs over a period of time in the cell i, $$A_{ji} = \frac{1}{N_j}\left(\sum_{k=1}^{N_j} A_{ji}^k\right)$$

is a metric indicates an interference from a cell i to a cell j, caused by the assigned resource block of the cell i measured by all UEs over a period of time in the cell j, each $A_{ji}^k$ and $A_{ij}^k$ are a measurement of an interference to an UE measured at a time. The $A_{ij}^k$ is a relative measurement of a reference signal receive power (RSRP) caused by the assigned resource block of the cell j measured by an UE in the cell i, and $A_{ji}^k$ is a relative measurement of a RSRP caused by the assigned resource block of the cell i measured by an UE in a cell j. Furthermore, the network NRT for the network is generated from a plurality of base station NRTs received from a plurality of base stations located in the plurality of cells, and a base station NRT for the base station located in the cell i is generated from a plurality of data $A_{ij}^k$ received from a plurality of UEs located in the cell i.

In accordance with an example embodiment, an apparatus for a wireless network is disclosed. The apparatus is located in a cell of a wireless network and may comprise a collection unit configured to receive a plurality of data $A_{ij}^k$ measured by a plurality of User Equipments (UE) in the cell, wherein an $A_{ij}^k$ is a relative measurement of a reference signal receive power (RSRP) caused by an assigned resource block of an adjacent cell j measured by an UE in the cell. The apparatus may further comprise a storage unit configured to store a base station neighboring relation table (NRT) generated from a plurality of data $A_{ij}^k$, and a reporting unit configured to report the base station NRT to a network management system, wherein a resource block comprises a frequency bandwidth, a time slot, or a power level of a signal. The apparatus may further comprise a receiver configured to receive an assigned resource block, and a mode configuration unit configured to perform a configuration of the assigned resource block so that a UE can communicate with the apparatus using the assigned resource block.

BRIEF DESCRIPTION OF THE DRAWINGS

For a more complete understanding of the present invention, and the advantages thereof, reference is now made to the following descriptions taken in conjunction with the accompanying drawing, in which:

FIGS. 2(a)-2(d) illustrate examples of various fractional frequency reuse (FFR) assignments;

FIGS. 3(a)-3(b) illustrate examples of some embodiment operations performed by a base station eNB;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present disclosure relates to communications, and, in particular embodiments of methods and apparatus for inter-cell interference coordination (ICIC) self-organized Network, ICIC self-organized mode selection algorithms, and fractional frequency reuse coloring algorithms.

Figure 1:
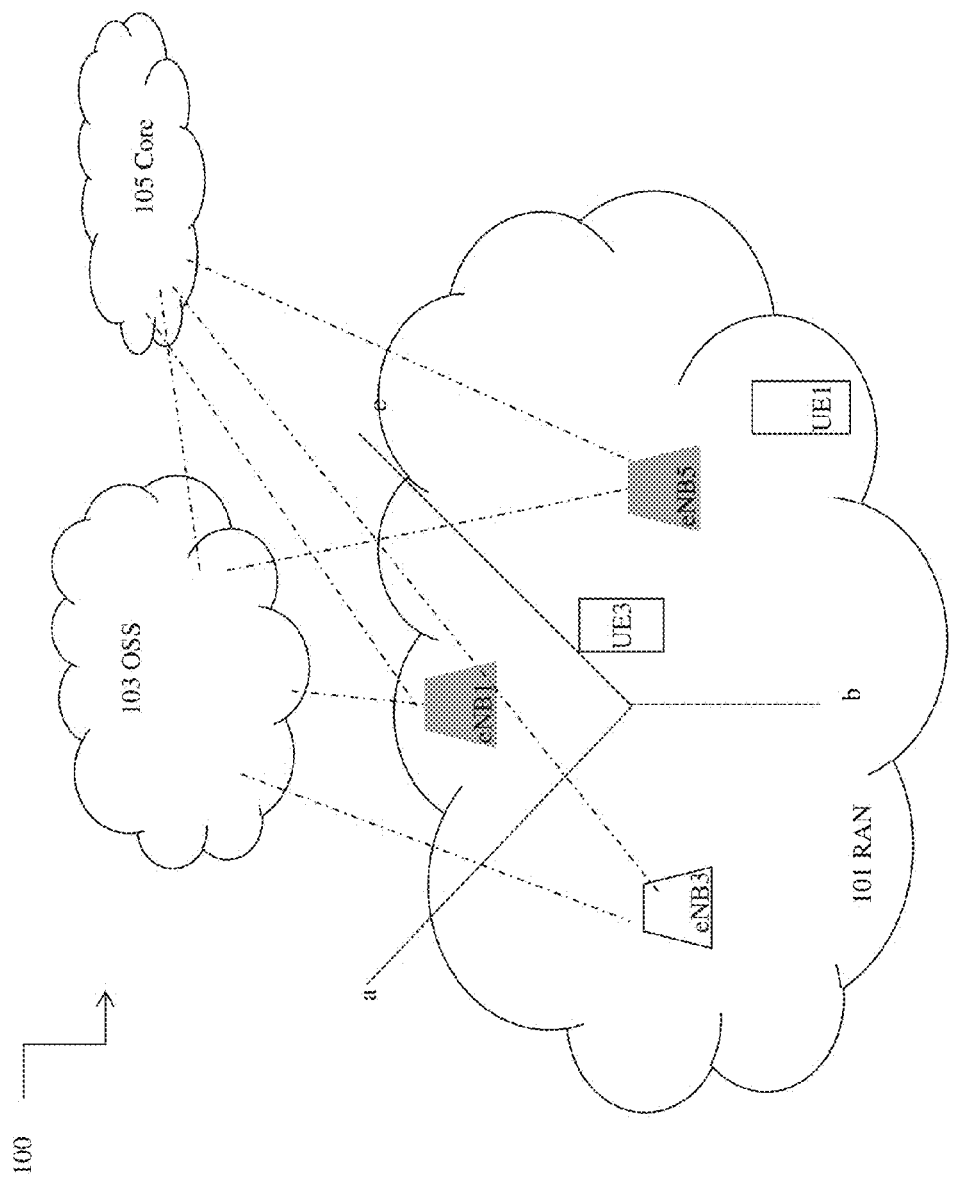
FIG. 1 illustrates an example of a wireless system with a plurality of eNBs, a core network, and an operation support system.

A communications network, such as a Long Term Evolution/System Architecture Evolution (LTE/SAE) network, is illustrated in FIG. 1. The SAE is the core network architecture of the LTE network. The LTE/SAE network comprises a radio access network (RAN) 101, an operation support system (OSS) 103, and a core network (CN) 105. The communication network 100 is not limited to LTE/SAE network. Rather it may be other kind of networks comprising a radio access network, an operation support system, and a core network, with similar functions. Networks with other or different components can also benefit from the features discussed herein.

The OSS 103 is a network management system supporting one or several management functions in the LTE/SAE network, such as fault, performance, security, and configuration functions. The OSS 103 can be used to change the network configuration by network operators. The OSS 103 may have a different name. As long as a component performs the described functions in the disclosure, it can be viewed as an OSS 103 in the network 100.

The network 100 may comprise one OSS 103 that manages both the CN 105 and the RAN 101. Alternatively, the network can comprise a core OSS for management of the CN 105 and a separate RAN OSS for management of the RAN 101. In some embodiments, the OSS 103 may be a part of the CN 105. However, the function of the network 100 is not dependent of whether the OSS 103 resides in the CN 105, the RAN 101 or elsewhere in the network 100. The OSS 103 has therefore been illustrated as a separate part of the network 100 to increase the visibility of the network 100 illustrated in FIG. 1. The OSS 103 may be arranged to communicate with a higher-level network management system (not shown) which typically is configured to supervise and manage a plurality of network domains, such as the network domain 100.

The CN 105 may comprise an SAE Gateway (not shown), and may also be connected to components of other networks, such as a UMTS network (not shown) or an IP network to further communicate with other networks in the world.

The RAN 101 is a radio access network, or a wireless network. It may comprise a plurality of base stations or enhanced Nodes B (eNBs). Neighbouring nodes eNB1, eNB3, and eNB5 may be connected to each other via a communication interface (not shown). The communication interface may be a X2 interface, which is sometimes referred to as the "transport connection" and is typically a cable through which eNB1, eNB3, and eNB5 may communicate with each other. Each node eNB1, eNB3, and eNB5 may also communicate with the OSS 103 and the CN105 directly or indirectly.

In one embodiment, a large number of eNBs are managed by the OSS 103, located in a large geographic area, such as a metropolitan area. The three eNBs shown in FIG. 1 are only for illustration purposes and are not limiting. A subset of eNBs or base stations, such as eNB1 and eNB5 in FIG. 1, may form a network neighborhood of the RAN, which is a partial network of the RAN 101, or a subset of the RAN 101.

Each eNB covers a cell or a coverage area and is arranged to allow any authorized user equipment (UE) such as UE1 or UE3 located within its cell to communicate through the network 100. A UE may also be referred to as a mobile station, terminal, user, and so forth, including telephones, PDAs, computers and others. An eNB covers a cell around itself, which may be an approximately as a hexagon with the base station in the center. In FIG. 1, eNB3 covers a hexagon with edges a and b, (other edges not shown), eNB5 covers a hexagon with edges b and c (other edges not shown), and eNB1 covers a hexagon with edges a and c (other edges not shown).

The RAN 101 may be an OFDMA system, where the time-frequency two-dimensional electric waves are composed of an OFDM symbol in the time domain and a frequency subchannel in the frequency domain. Each frequency subchannel is composed of a plurality of different subcarriers. Each such a unit of time-frequency domain may be called a resource block for communication. For some embodiments, a resource block may further comprise a power level of the signal in a time-frequency domain.

In an OFDM symbol time interval, each user in the cell uses an orthogonal frequency subchannel or channel. Therefore, the OFDMA system is free from intra-cell interference. The downlink (DL) and uplink (UL) of the RAN 101 may use various OFDMA technologies, which are not necessarily the same. For example, LTE uses OFDMA in the downlink (DL) and single carrier frequency division multiple access (SC-FDMA) in the uplink (UL) as the physical layer radio access technology. The descriptions in the disclosure mainly focus on DL notations, while the same can be done in the UL. Those skilled in the art can easily see the application of the ideas in the disclosure in the UL setting.

When different cells or users use the same frequency subchannel for transmitting messages in the same time interval, an inter-cell interference (ICI) may occur. Thus, the link quality of the cell edge user degrades and the data throughput decreases, which are serious problems in an OFDMA system. ICI-aware frequency channel, subband, or resource block allocation and assignment schemes are important for OFDMA systems. Inter-cell interference coordination (ICIC) comprises a number of techniques to reduce and manage the inter-cell interference.

ICIC techniques comprise various methods. One such method is fractional frequency reuse (FFR). FFR is a frequency-domain interference coordination technology. FFR may be supported by multiple systems such as LTE and WiMAX.

In a RAN 101 utilizing FFR, the frequency band may be divided into several subbands, where each cell is assigned to predominantly use one subband or a channel. Soft frequency reuse is a broadcasting power interference coordination technology, which broadcasts more power to the cell edge area and less power to the center cell area. Each cell is assigned to predominantly use different power levels in the DL transmission or have different tolerable interference in the UL reception. Different possible subband assignments, or channel assignments, to a cell and its power setups for a cell are referred as different modes, or resource blocks used for the cell. Each cell, receives one or more modes or resource blocks. Each mode can be referred as a resource block assignment as well. The system mode selection can be controlled by the OSS 103, which bases its decision on performance data received manually or collected from eNB or UEs. The mode or resource block assignment can be changed and reassigned in a periodic way or in some other ways.

FFR can be implemented in different ways, as illustrated in FIGS. 2(a)-2(c). As illustrated in FIG. 2(a), the frequency band is divided into three subbands, each represented by a different shadow. Sometimes the different subbands may be represented by different colors as well (not shown). The assignment of the subband to a cell in an RAN is represented by coloring the cell with the color, or the shape, the shadow, of the subband. The use of subband is only for illustration purposes and are not limiting. There may be other kind of resource blocks instead of subband only. Adjacent cells have different color assignments, therefore adjacent cells do not use the same subband to reduce the ICI of adjacent cells.

Similarly, the frequency band is divided into six subbands in FIG. 2(b), each represented by a different color, shape, and shadow. The marks in FIGS. 2(a) and 2(b) have the same height in the power-frequency coordinates, which means they are assigned to the same power level. The subbands may be assigned to different power levels. There may be different number of divisions of the frequency band rather than three subbands or six subbands. For example, the frequency band can be divided into seven subbands or nine subbands. The disclosed techniques work for any different kinds of subband divisions, or resource block assignments.

There may be other ways to assign the subband to different cells. One example way is illustrated in FIG. 2(c). In FIG. 2(c), each cell is divided into a center region and an edge region. The same frequency subband is assigned to the center of each cell, which allows the center of each cell to use the same subband. In this case, the frequency reuse factor (FRF) equals to 1, termed as reuse-1 or FRF=1. On the other hand, a FRF greater than 1 for the frequency in the cell edge region is assigned to reduce inter-cell interference. Thus the link quality is considered to be improved and the data throughput is considered to be increased. The subband assigned to the center region of cells shown in the power-frequency coordinate has a smaller height, representing a smaller power assignment.

In another embodiment, every cell can use the entire subband, while broadcasting more power to the cell edge area and less power to the center cell area. Similar techniques can be used that to assign each cell to one color (one subband) only, but the center of the cell has lower power while the edge of the cell has higher power. It is desirable that no adjacent cells can have the same color, which means no adjacent cells can use the same subband, therefore reducing the ICI among cells. However, sometimes this objective is hard to reach.

The examples illustrated in FIGS. 2(a)-2(c) can be generalized that the frequency subbands or resource block assignment problem can be solved using a graph coloring approach, as shown in FIG. 2(d). Each node from a to h in the graph in FIG. 2(d) corresponds to an eNB in the network to which resource blocks are allocated, shown in FIG. 2(c), where the node a to h are located in the center of the cells in FIG. 2(c). The nodes a to h may be referred as a plurality of cells to be colored, which may be the complete network or only part of a network. The edge connecting two nodes represents the ICI between the two cells, which typically corresponds to the geographical proximity of the eNBs. Then, the resource block assignment problem subject to the interference constraints becomes a node coloring problem, wherein one objective is to reduce assignment conflicts, i.e., two adjacent interfering nodes should not have the same color. A color is a resource block assignment.

In some embodiments, the nodes to be assigned resource blocks comprising all the nodes of a network, which is a global configuration. In some other embodiments, the nodes to be assigned resource blocks may be only part of a network, which is a network neighborhood. Furthermore, FFR can be reassigned after a set of nodes have been previously assigned resource blocks. The reassignment of resource blocks may be triggered by various network events.

The FFR assignments shown in FIGS. 2(a)-2(c) do not have a conflict assignment among cells, i.e., an assignment of two adjacent cells with the same color or the same resource block. Sometimes when the number of cells is many and the available colors (resource blocks) are few, assignment conflicts may occur. One objective of various FFR assignment algorithms is to reduce interferences among adjacent cells with the same resource block assignment, measured by a network performance metric related to a number of resource block assignment conflicts over the plurality of cells to be colored. There may be many such network performance metrics used for guiding the assignment of the resource blocks. Such network performance metrics can be functions of other performance indicators such as cell loading, cell edge loading, cell sizes, numbers of users, scheduling statistics, handover success rate, and UE signal to interference and noise ratio (SINR) geometry. The metrics for UL and DL are not necessarily the same, hence possible difference between UL and DL coloring.

In heterogeneous networks, different transmit power by nodes can also be considered in a network performance metric definition used for optimize FFR assignment. One such network performance metric may be based on the Reference Signal Receive Power (RSRP), which is a measurement of a signal transmitted from an eNB to the UE. A metric that is based on the RSRP report by the UEs in the cells and represents the residual interference can be used to build up a neighbor relation table (NRT) of the network.

As illustrated in FIG. 3(a), a UE, such as UE1 or UE3 in one cell centered at eNB5 may receive different level of signals from the neighboring eNBs, such as eNB1 and eNB3. The UE1 or UE3 may measure the RSRP, which is a measurement of a signal transmitted from an eNB to the UE. A higher RSRP value indicates a higher received signal power received by the UE. Such measurements may be required by some communication standards such as LTE, or may be voluntary. UEs measure RSRP values for the serving eNB (i.e., the eNB on which they are currently camped) and neighbouring eNBs.

The RSRP values measured by each UE may be transmitted to its serving eNB, anchor base station, or anchor eNB. The anchor eNB may build up a table, called a base station RRSP table. One such RRSP table is illustrated in FIG. 3(b). For the UE1 and UE3 served by eNB 5 in FIG. 3(a), the RSRP values may be stored as follows, where R(Cell j, Cell i, UE#, t1) is the RSRP value measured by a UE # of eNB i at time t1, caused by the resource block assignment in cell j, as shown in FIG. 3(b). Mathematically, the measurement R(Cell j, Cell i, UE#, t1) may be represented by $A_{ij}^{k}$, which is a measurement of a RSRP caused by the assigned resource block of the cell j measured by an UE in the cell i, at a time instant k. Similarly, the notation $A_{ji}^{k}$ is a measurement of a RSRP caused by the assigned resource block of the cell i measured by an UE in a cell j, at a time instant k. A base station located in the cell i receives the data $A_{ij}^{k}$ measured by an UE in the cell i, and maintains data $A_{ij}^{k}$ in the base station.

| | |
|---|---|
| UE1 | R(eNB5, eNB5, UE1, t1), R(eNB3, eNB5, UE1, t2), R(eNB1, eNB5, UE1, t3) |
| UE3 | R(eNB5, eNB5, UE3, t4), R(eNB3, eNB5, UE3, t5), R(eNB1, eNB5, UE3, t6) |

The RSRP value for a particular eNB, as measured by a UE, is generally inversely proportional to the distance of that UE from the eNB. That is, a UE close to the eNB will have a relatively high RSRP value, and a UE further far from the eNB will have a relatively low RSRP value. As will be known to those skilled in the art, the RSRP value is not solely proportional to distance, but will also be affected by other factors, such as obstructions to the radio signal path between the UE and the eNB.

As shown in FIG. 3(a), UE3 and eNB5 are closer to each other than any other UE/eNB combination. Therefore, the RSRP value for the UE3 and eNB5 might be measured as a relatively high value, 4. This could be expressed as: R(eNB5, eNB5, UE3, t1)=4. The UE/eNB pair with the greatest distance is UE1 and eNB1. The RSRP value for this pair will be relatively low, for example: R(eNB1 eNB5, UE1, t2)=1. Those numbers for R(eNB5, eNB5, UE3, t1) and so on are for illustration purposes only and are not limiting. There may be other measurement numbers used.

A base station located in the cell i receives the data $A_{ij}^{k}$ measured by an UE in the cell i, and maintains data $A_{ij}^{k}$ in the base station. The base station may maintain many $A_{ij}^{k}$ measured by different UEs at different times in a time period. Therefore, a better measurement is one that averages out fluctuations in the RSRPs reported by the different UEs over the period of time. The average relative residual interference between two neighbor cells, which may be called as the mutual interference, is a relative interference measurement between the cells, which is a metric based on the RSRP reports showing the "electrical" proximity of different pairs of cells. It measures how much UEs served by one cell are likely to be affected by the interference from other cells. Mutual interference between cell i and j is denoted by an element $B_{ij}$, and defined as $B_{ij}=A_{ij}+A_{ji}$. Here $$A_{ij} = \frac{1}{N_i}\left(\sum_{k=1}^{N_i} A_{ij}^k\right)$$

is a metric indicates an interference from a cell j to a cell i, caused by the assigned resource block of the cell j measured by all UEs over a period of time in the cell i, $$A_{ji} = \frac{1}{N_j}\left(\sum_{k=1}^{N_j} A_{ji}^k\right)$$

is a metric indicates an interference from the cell i to the cell j, caused by the assigned resource block of the cell i measured by all UEs over a period of time in the cell j, each $A_{ji}^{k}$ and $A_{ij}^{k}$ are a relative measurement of an interference to an UE measured at a time. The base station generates a base station neighbor relation table (NRT) based on the element $B_{ij}$. A base station NRT is a matrix of size of s*s, and s is a number of the adjacent cells around the cell the base station is located, where each element of the matrix is $B_{ij}$ defined above.

The base station located in the cell i further reports the base station NRT to a network management system. The network management system receives all the base station NRTs from all the cells to be colored, and then generates the network NRT for the network. The network NRT comprises a matrix of size of n*n, and n is a number of the cells to be colored or to be assigned resource blocks. A network performance metric based on a network NRT may be defined as $$I = \sum_{i}\sum_{j>i, C_j=C_i} B_{ij},$$

which may be used as an optimization criteria for FFR color resource block assignment algorithms, where $c_i$ is the color assigned to cell i. The smaller the number I, the smaller interference among the cells by the resource assignment scheme.

Figure 4A:
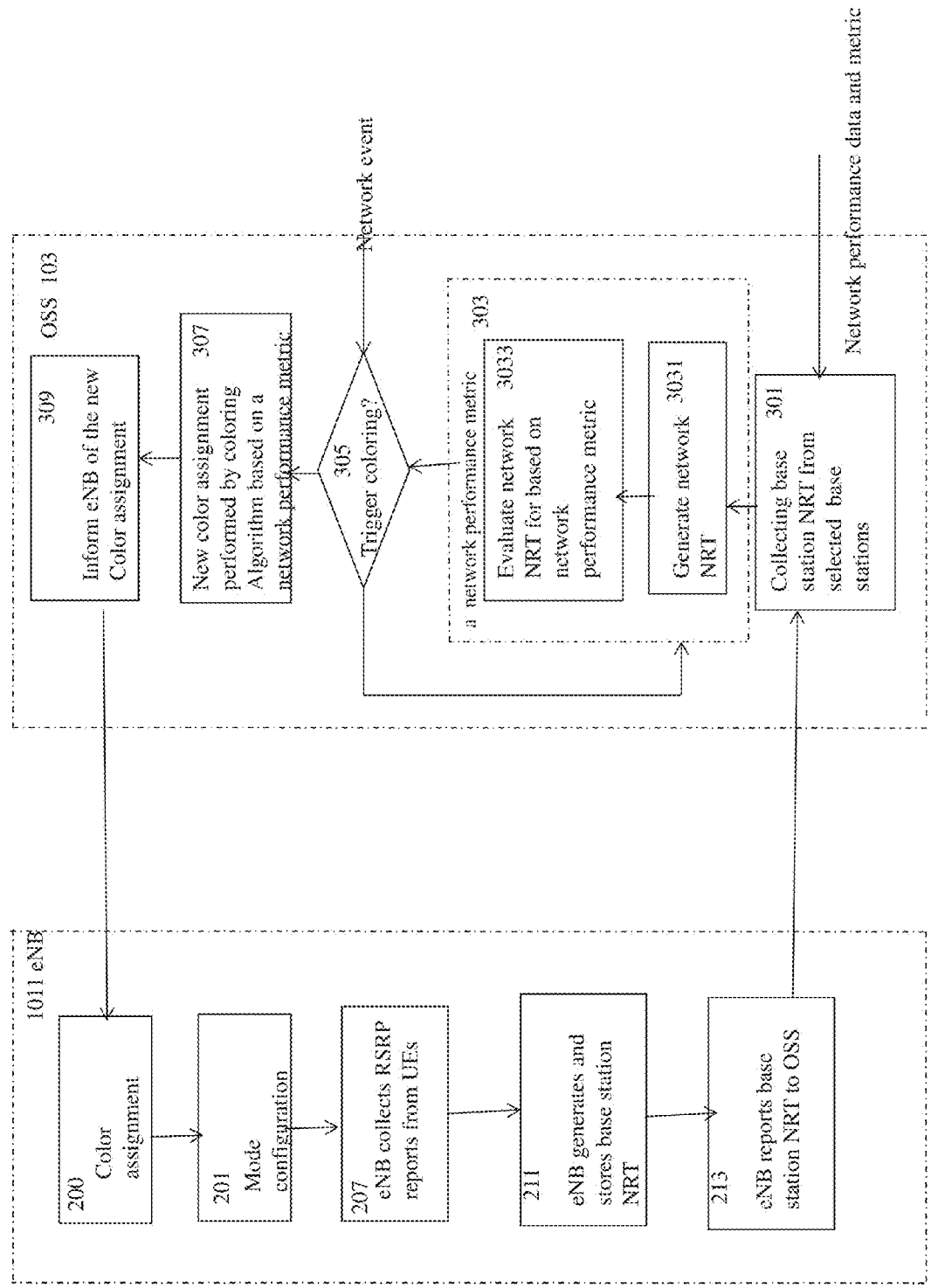
FIGS. 4(a)-4(b) illustrates an example of some embodiment operations performed by an eNB and a network manage system such as an operation support system (OSS)
Figure 4B:
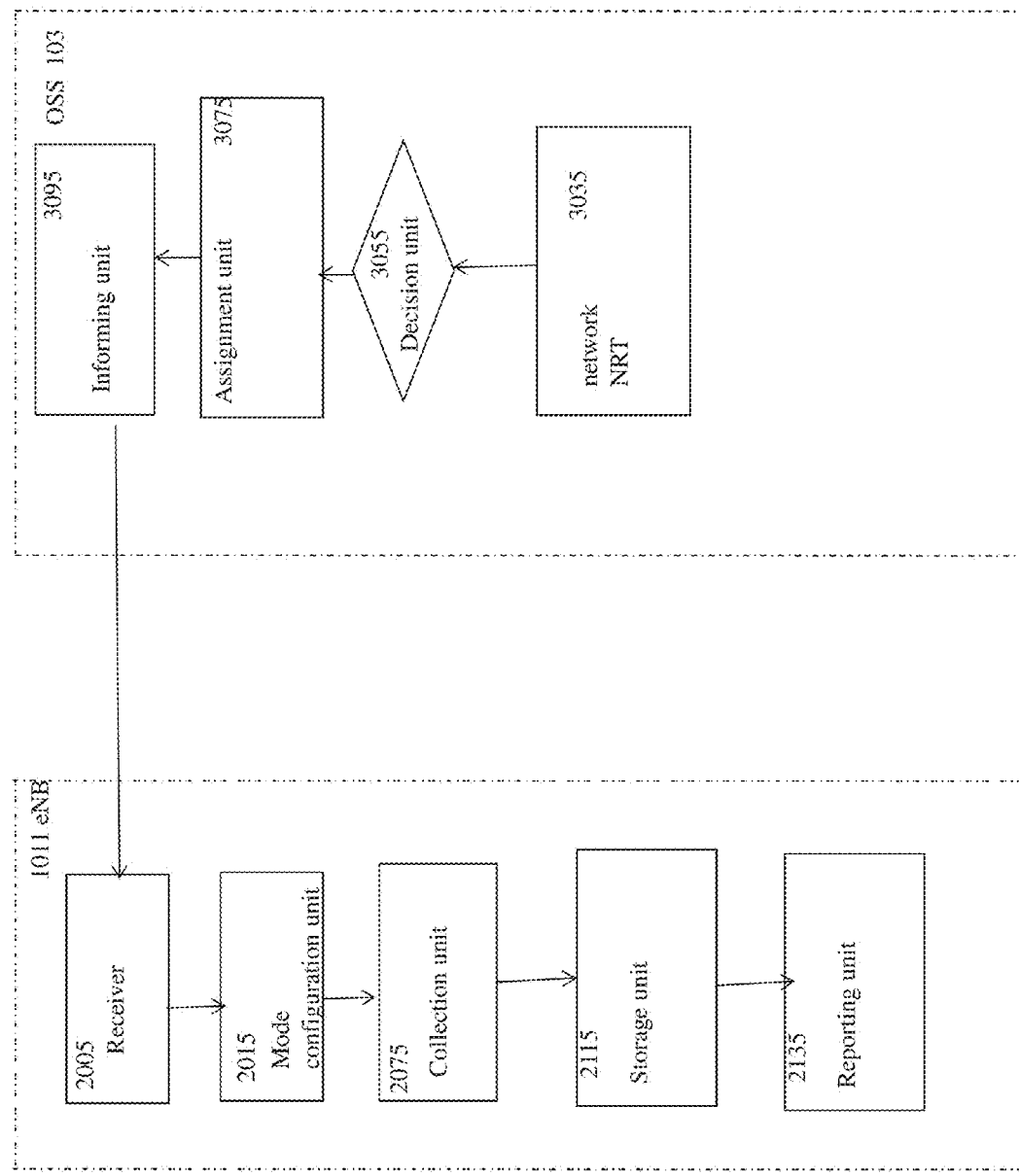

The process illustrated so far may be further illustrated in more detail in FIGS. 4(a) and 4(b). In FIG. 4(a), an eNB 1011 first receives an assigned color or a resource block at step 200 by a receiver within eNB. The receiver 2005 is shown in FIG. 4(b). The eNB performs the mode configuration of the assigned resource block at step 201 so that UEs can communicate with the eNB using the assigned resource block. The mode configuration is performed by the mode configuration unit 2015 shown in FIG. 4(b). The eNB and the UEs may communicate in other resource blocks in other ways different from the assigned resource blocks by the OSS.

At step 207, the eNB collects $A_{ij}^{k}$, which is a relative measurement of a RSRP caused by the assigned resource block of the cell j measured by an UE in the cell i, at a time instant. This step 207 may be performed by a collection unit 2075 within the eNB as shown in FIG. 4(b).

The eNB, at step 211 generates and stores base station NRT, which is the matrix s*s, is a number of the adjacent cells around the cell the base station is located, where each element of the matrix is $B_{ij}$ defined above. The generated base station NRT may be stored in a storage unit 2115 within the eNB as shown in FIG. 4(b). The eNB then reports the base station NRT to the OSS 103 in step 213. This function can be performed by a reporting unit 2135 within the eNB as shown in FIG. 4(b).

The base station eNB 1011 and the OSS 103 may be the ones illustrated in FIG. 1. The sequence of operations from step 200 to 213 is only for illustration purposes and is not limiting. The operations can be done out of sequence, and the operations do not depend on each other. For example, eNB must always collect RSRP, no matter what the color is.

The OSS 103 collects base station NRT from all base stations at step 301, and generates the network NRT in step 3031. The network NRT is stored in a unit 3035 shown in FIG. 4(b). The OSS 103, at step 3033, evaluates the generated network NRT based on the network performance metric, and may compare it with a predetermined threshold for the network NRT. The OSS 103 may determine whether to trigger the coloring decision at step 305. The determination of whether to trigger the coloring decision is performed by a decision unit 3055 shown in FIG. 4(b). If such a coloring decision is triggered at step 305, various coloring algorithms can be performed at step 307, and the eNBs will be informed of the coloring assignment decision at step 309. The coloring algorithms may be performed by an assignment unit 3075 shown in FIG. 4(b), and the eNBs may be informed by an informing unit 3095 shown in FIG. 4(b).

The above illustrated process shown in FIGS. 4(a) and 4(b) is only for illustration purpose and is not limiting. For example, the coloring decision can be triggered with different criteria, such as cell addition/deletion, network or RF change, interference metric change, which are shown as a network event input to step 305 in FIG. 4(a). Other network performance data can be collected in step 301 instead of or in addition to the network NRTs, and evaluated in step 303. Such network performance metrics may be functions of other performance indicators such as cell loading, cell edge loading, cell sizes, a number of users, scheduling statistics, handover success rate, and UE SINR geometry. The metrics for UL and DL are not necessarily the same, hence possible difference between UL and DL coloring. In heterogeneous networks, different transmit power by nodes can also be considered in metric definition.

FIGS. 5-8 illustrate various coloring algorithms which may be performed at step 307 in FIG. 4(a). All four algorithms are of a greedy algorithm nature and would be considered suboptimal. However, they can be further used in back-tracking schemes to find the optimal solutions. The sub-optimal iterative algorithm starts with a cell and colors it. Then, at each step identifies the most effective candidate cell and assigns the best color to it until all the cells are colored. Starting from different cells might result in a different color set and the best color set among different starting points that optimizes the metric is selected. The same algorithm can be used for local recoloring or local optimization of the color. With a change in the neighborhood relation table, one can identify possible cell conflicts and select a neighborhood to resolve the issue by recoloring only that neighborhood. Also, after global coloring, some local conflict resolutions may improve the performance of the coloring algorithm. This algorithm can also be applied for multi-level coloring where some or all cells may receive more than one color. The multi-color FFR can be used for dynamic ICIC power utilization.

Figure 5:
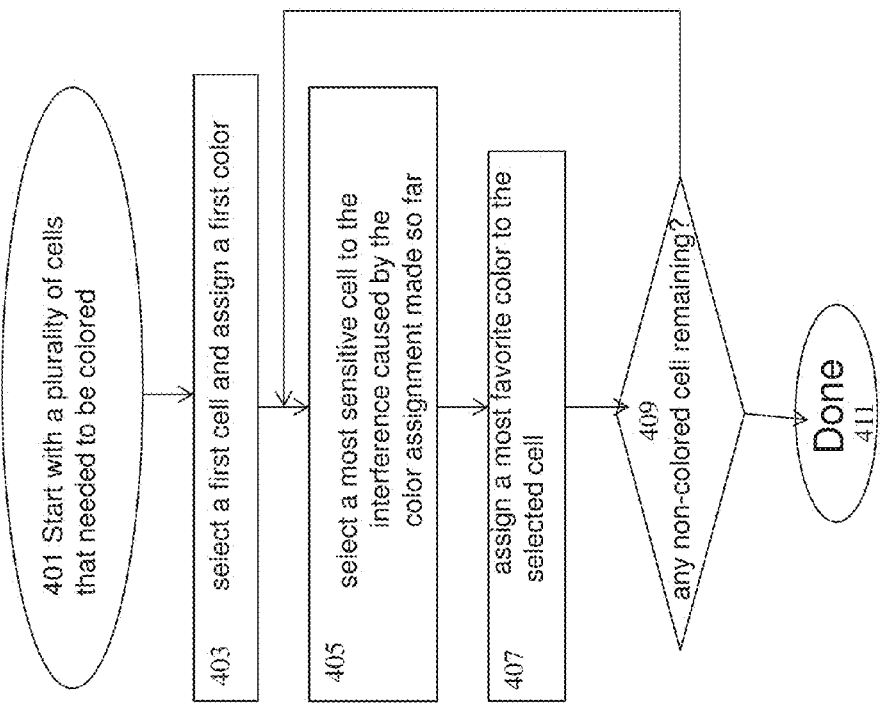
FIG. 5 illustrates a network cell coloring algorithm.

As illustrated in FIG. 5, the network cell coloring algorithm starts at step 401 with a plurality of cells that needed to be colored, selects a first cell among the plurality of cells at step 403, and assigns a first resource block to the first cell. At step 405, the algorithm further determines among the plurality of cells which have not been assigned a resource block a first most sensitive cell to an interference caused by the first resource block assigned to the first cell, and assigns, at step 407, a most favorite resource block to the first most sensitive cell. The first most sensitive cell and the most favorite resource block are measured by the network performance metric, so that the interferences caused by the choice of the most sensitive cell may be the cell with the strongest interference measured by the network performance metric. Similar choice is made for the most favorite color assignment. The algorithm further checks to see whether there is any non-colored cell remaining at step 409. If no non-colored cell remaining, the algorithm finishes its operation; otherwise, the algorithm goes to step 405 again and select the next most sensitive cell and assign the most favorite color to the selected cell.

Figure 6:
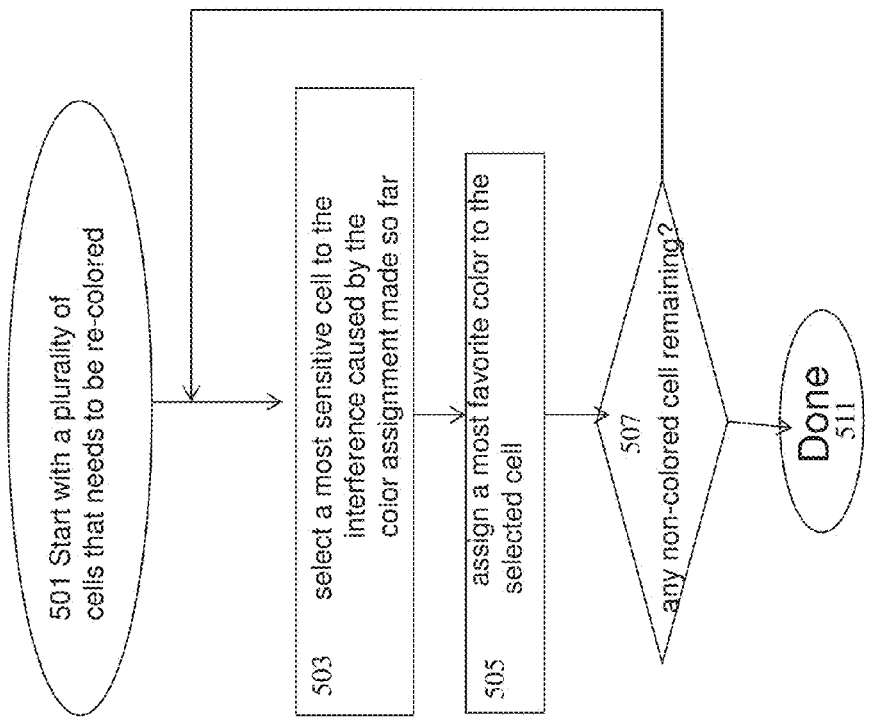
FIGS. 6-8 illustrates examples of various embodiments of FFR assignment algorithms.

A similar algorithm can be adapted to the coloring of a network neighborhood instead of a global network, wherein the network neighborhood may have an existing coloring assignment. This is illustrated in FIG. 6. At step 501, the algorithm starts from a set of cells that need to be re-colored. The algorithm then determines at step 503 among the plurality of cells a first most sensitive cell to an interference caused by the previously assigned resource blocks assigned to the plurality of cells, and assigns a most favorite resource block to the first most sensitive cell. The first most sensitive cell and the most favorite resource block are measured by the network performance metric. The algorithm further checks to see whether there is any non-colored cell remaining at step 507. If no non-colored cell remains, the algorithm finishes its operation; otherwise, the algorithm returns to step 503 and selects the next most sensitive cell and assigns the most favorite color to the selected cell.

Figure 7:
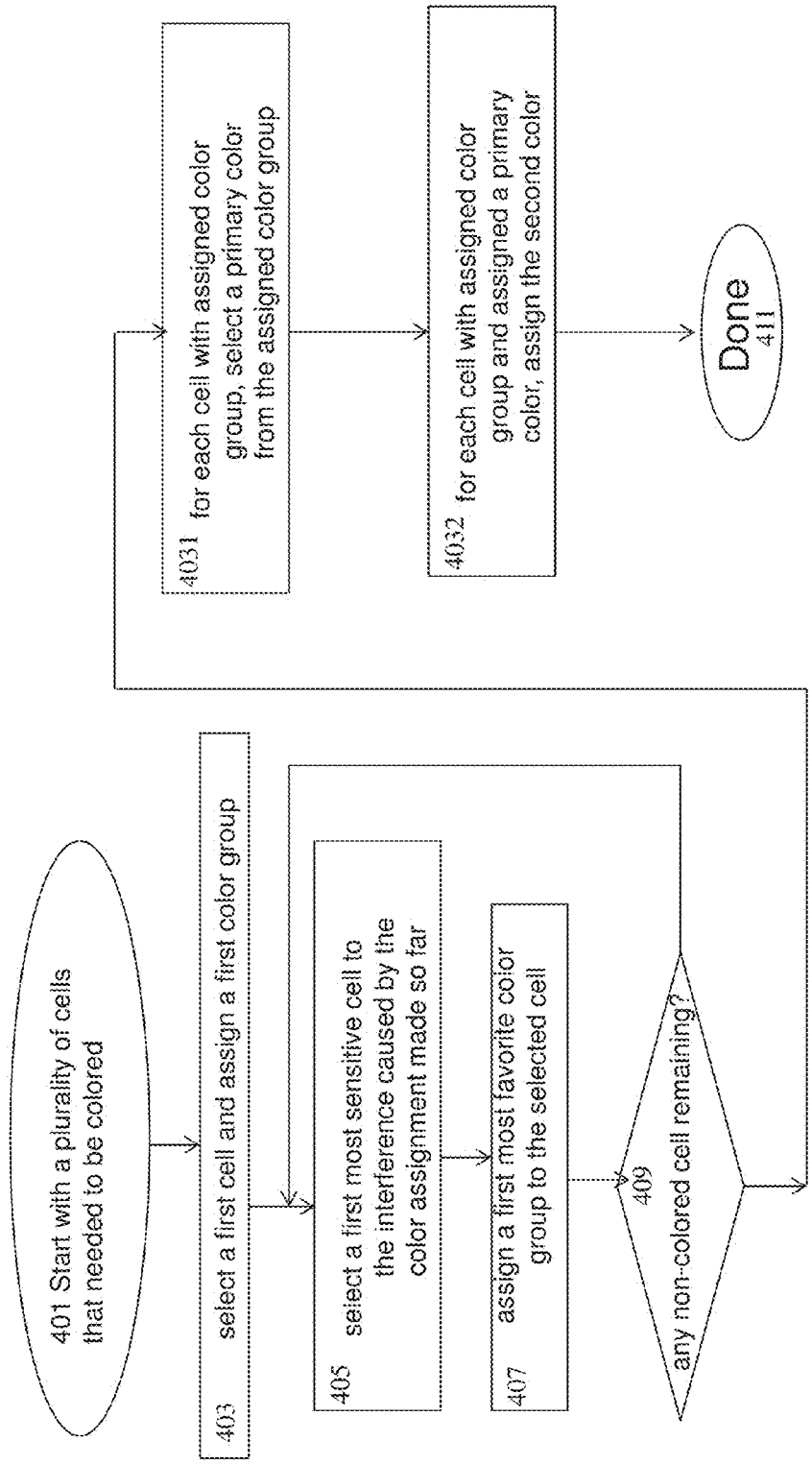
Figure 8:
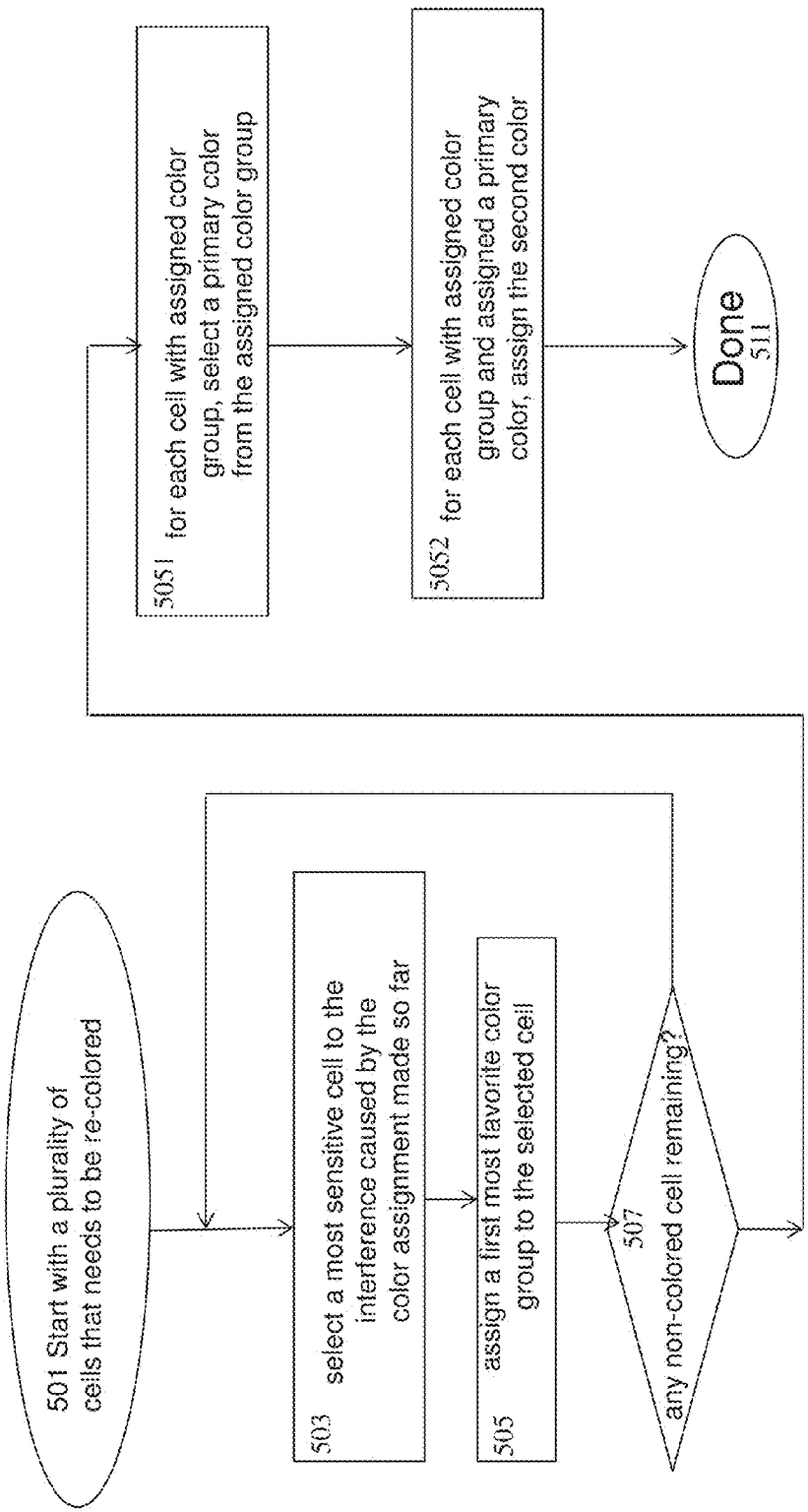

The algorithms illustrated in FIGS. 5 and 6 can further accommodate other kinds of color assignments. FIGS. 7 and 8 illustrate algorithms that can assign multiple colors to a cell based on a similar approach. The algorithm illustrated in FIG. 7 shows that the assignment is made in step 403 to assign a first color group instead of one color, wherein a color group may comprise a plurality of colors. Similarly a color group is assigned in step 407 to the selected cell. After each cell has been assigned a color group, the algorithm moves to step 4031 to select a primary color from the assigned color group for a cell among all the cells assigned color groups. The algorithm further assigns a second color from the assigned color group for eligible cells. Eligible cells comprise of cells which require and/or afford more colors.

The algorithm illustrated in FIG. 8 works in a similar manner as the algorithm in FIG. 7. This algorithm assigns a color group to a selected cell in step 505 and does this for all the cells of interest. Then the algorithm in FIG. 8 moves to step 5051 to select a primary color from the color group assigned to a cell for all the cells assigned color groups, and further assigns the second color in step 5052.

The examples shown in FIGS. 7 and 8 are only for illustration purposes only and are not limiting. There may be more than two colors in a color group and each cell may be assigned more than two colors.

Each cell in the algorithms shown in FIGS. 7 and 8 has two assigned colors, one as a primary color and one as a secondary color. The primary color may be assigned to a first area of the cell and the secondary color may be assigned to a second area of the cell. Accordingly, an effect of interference among adjacent cells with a same resource block assignment is reduced measured by the network performance metric related to a number of resource block assignment conflicts over the plurality of cells.

Figure 9:
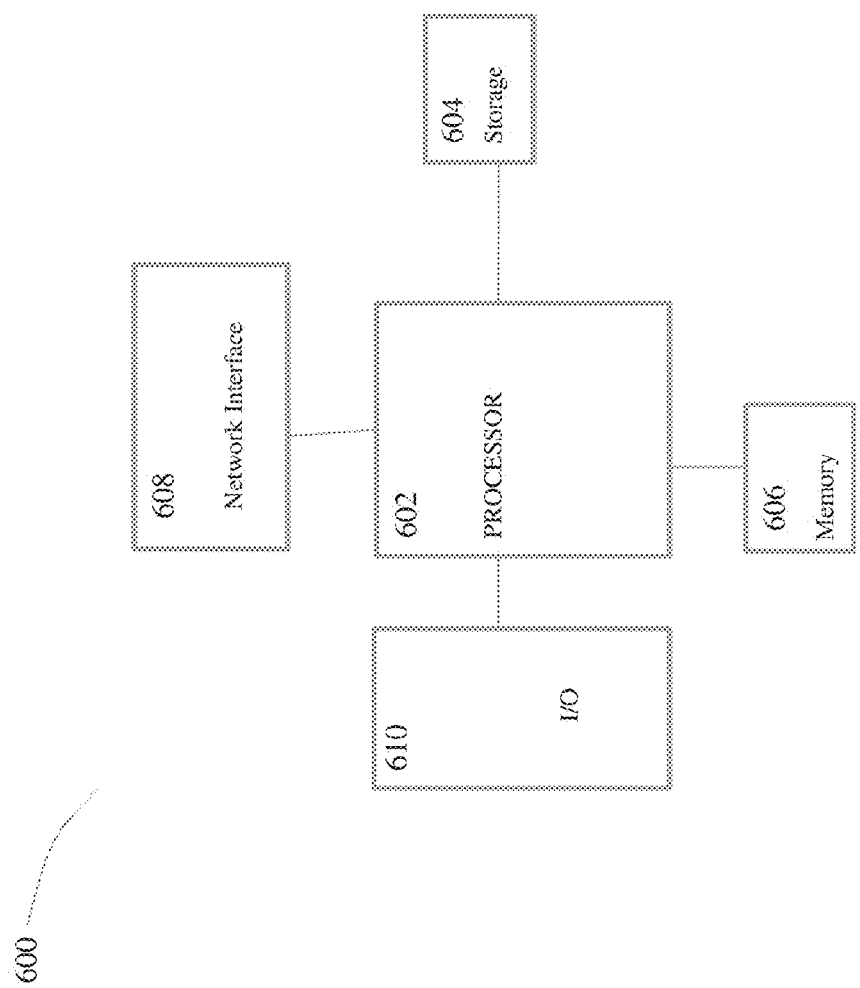
FIG. 9 illustrates an example of a controller implementing the operations.

Through the descriptions of the preceding embodiments, the present invention may be implemented by using hardware only or by using software and a necessary universal hardware platform. FIG. 9 illustrates one example of a unit 600 according to an embodiment of the invention. Unit 600 may be used in conjunction with and may perform the functions of the UE1, eNB 1011 or the OSS 103 shown in FIGS. 1 and 4. In the same or alternative embodiments, controller 600 may reside at, be component of, or may be used by one or more UEs, eNBs, and OSS.

The unit 600 may contain a processor 602 that controls the overall operation of the controller 600 by executing computer program instructions which define such operation. Processor 602 may include one or more central processing units, read only memory (ROM) devices and/or random access memory (RAM) devices. The processor 602 may be an ASIC, a general purpose processor, a Digital Signal Processor, a combination of processors, a processor with dedicated circuitry, dedicated circuitry functioning as a processor, and a combination thereof.

The computer program instructions may be stored in a storage device 604 (e.g., magnetic disk, database, etc.) and loaded into memory 606 when execution of the computer program instructions is desired. Thus, applications for performing the herein-described method steps, such as precoding, scheduling, transmitting and receiving data can be defined by the computer program instructions stored in the memory 606 or storage 604 and controlled by the processor 602 executing the computer program instructions.

In alternative embodiments, hard-wired circuitry or integrated circuits may be used in place of, or in combination with, software instructions for implementation of the processes of the present invention. Thus, embodiments of the present invention are not limited to any specific combination of hardware, firmware, or software. The memory 606 may store the software for the controller 600, which may be adapted to execute the software program and thereby operate in accordance with the present invention and particularly in accordance with the methods described in detail above. However, the invention as described herein could be implemented in many different ways using a wide range of programming techniques as well as general purpose hardware sub-systems or dedicated controllers.

The unit 600 may also include one or more network interfaces 608 for communicating with other devices via a network. In wireless portions of the network, the network interface could include an antenna and associated processing. In wired portions of the network, the network interface could include connections to the cables that connect the unit to other units. In either case, the network interface could be thought of as circuitry for accessing the physical communications portions (such as the antenna).

The unit 600 could also include input/output devices 610 (e.g., display, keyboard, mouse, speakers, buttons, etc.) that enable user interaction with the controller 600. These user I/O devices are optional and not needed if the unit 600 is accessed by the network interfaces only.

An implementation of unit 600 could contain other components as well, and that the controller of FIG. 9 is a high level representation of some of the components of such a controller for illustrative purposes.

As described above, embodiments the present invention may be embodied in the form of a software product. The software product may be stored in a nonvolatile or non-transitory storage medium, which can be a compact disk read-only memory (CD-ROM), USB flash disk, a removable hard disk, or any other storage device. The software product includes a number of instructions that enable a computer device (personal computer, server, or network device) to execute the methods provided in the embodiments of the present invention.

Although the present embodiments and their advantages have been described in detail, it should be understood that various changes, substitutions and alterations can be made herein without departing from the spirit and scope of the embodiments as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of resource allocation for use in a wireless network, the method comprising:
    triggering, upon occurrence of a network event, a network coloring decision to assign a plurality of resource blocks to a plurality of cells within the wireless network; and
    performing a network coloring by assigning each cell of the plurality of cells a resource block from the plurality of resource blocks, wherein an effect of interference among adjacent cells with a same resource block assignment is reduced as measured by a network performance metric related to a number of resource block assignment conflicts over the plurality of cells, wherein the network performance metric is in accordance with a network neighboring relation table (NRT) maintained for the network, and the network NRT comprises a matrix of size n*n elements, wherein n is a number of the plurality of cells,
    wherein an element $B_{ij}$ of the matrix is $B_{ij}=A_{ij}+A_{ji}$, wherein $$A_{ij} = \frac{1}{N_i}\left(\sum_{k=1}^{N_i} A_{ij}^k\right)$$

is a first metric that indicates an interference from a cell j to a cell i, which is caused by an assigned resource block of the cell j measured by all UEs over a period of time $N_i$ at each time instant k in the cell i,
    wherein $$A_{ji} = \frac{1}{N_j}\left(\sum_{k=1}^{N_j} A_{ji}^k\right)$$

is a second metric that indicates an interference from the cell i to the cell j, which is caused by an assigned resource block of the cell i measured by all UEs over a period of time $N_j$ at each time instant k in the cell j, and
    wherein $A_{ji}^k$ and $A_{ij}^k$ are each a relative measurement of an interference to a UE measured at time instant k.

2. The method of claim 1, further comprising:
    informing a plurality of base stations, each base station located in an associated cell of the plurality of cells; and
    configuring each base station of the plurality of base stations to operate with the resource block assigned to the associated cell.

3. The method of claim 1, wherein a resource block comprises a frequency bandwidth, a time slot, or a power level of a signal.

4. The method of claim 1, wherein the network event comprises a cell addition, a cell deletion, a network change, a frequency band change, a periodic trigger, or a change in the network performance metric.

5. The method of claim 1, wherein performing the network coloring comprises:
    selecting a first cell among the plurality of cells and assigning a first resource block to the first cell;
    determining which cell among the plurality of cells that have not been assigned a resource block is a first most sensitive cell, the first most sensitive cell being most sensitive to interference caused by the first resource block assigned to the first cell; and assigning a most favorite resource block to the first most sensitive cell;

wherein the first most sensitive cell and the most favorite resource block are determined by measurement of the network performance metric.

6. The method of claim 5, wherein performing the network coloring further comprising:

determining which cell that has not been assigned a resource block is a most sensitive cell remaining, the most sensitive cell remaining being most sensitive to interference caused by previously assigned resource blocks;

assigning a next most favorite resource block to the most sensitive cell remaining, wherein the most sensitive cell remaining and the next most favorite resource block are determined by measurement of the network performance metric; and repeating the determining and assigning steps until each of the plurality of cells has been assigned a resource block.

7. The method of claim 1, further comprising:

assigning each cell among the plurality of cells another resource block, wherein the resource block of the cell is assigned to a first area of the cell and the another resource block is assigned to a second area of the cell.

8. The method of claim 1, wherein the network performance metric comprises a measurement of cell loading, cell edge loading, cell sizes, number of users, handover success rate, or user equipment (UE) signal to interference and noise ratio (SINR).

9. The method of claim 1, wherein the $A_{ij}^k$ is a relative measurement of a reference signal receive power (RSRP) caused by the assigned resource block of the cell j measured by a UE in the cell i, and $A_{ji}^k$ is a measurement of a RSRP caused by the assigned resource block of the cell i measured by a UE in the cell j.

10. The method of claim 9, wherein a base station located in the cell i receives the data $A_{ij}^k$ measured by the UE in the cell i, and maintains data $A_{ij}^k$ in the base station.

11. The method of claim 10, wherein the base station located in the cell i further maintains a base station NRT generated from a plurality of data $A_{ij}^k$ received from a plurality of UEs located in the cell i.

12. The method of claim 11, wherein the base station located in the cell i further reports the base station NRT to a network management system which generates the network NRT for the network.

13. The method of claim 12, wherein the network management system determines when to trigger the coloring decision in accordance with the generated network NRT for the network and a predetermined threshold for the network NRT.

14. A method of resource allocation for use in a wireless network, the method comprising:

selecting a first cell among a plurality of cells and assigning a first resource block to the first cell;

determining which cell among the plurality of cells that have not been assigned a resource block is a first most sensitive cell, the first most sensitive cell being most sensitive to interference caused by the first resource block assigned to the first cell;

assigning a most favorite resource block to the first most sensitive cell, wherein the first most sensitive cell and the most favorite resource block are determined by measurement of a network performance metric in accordance with a network neighboring relation table (NRT) maintained for the network, and the network NRT comprises a matrix of size n*n elements, wherein n is a number of the plurality of cells, wherein an element $B_{ij}$ of the matrix is $B_{ij}=A_{ij}+A_{ji}$, wherein $$A_{ij} = \frac{1}{N_i}\left(\sum_{k=1}^{N_i} A_{ij}^k\right)$$

is a first metric that indicates an interference from a cell j to a cell i, which is caused by an assigned resource block of the cell j measured by all UEs over a period of time $N_i$ at each time instant k in the cell i, wherein $$A_{ji} = \frac{1}{N_j}\left(\sum_{k=1}^{N_j} A_{ji}^k\right)$$

is a second metric that indicates an interference from the cell i to the cell j, which is caused by an assigned resource block of the cell i measured by all UEs over a period of time $N_j$ at each time instant k in the cell j, and wherein $A_{ji}^k$ and $A_{ij}^k$ are each a relative measurement of an interference to a UE measured at time instant k;

determining a most sensitive cell remaining from cells that have not been assigned a resource block, the most sensitive cell remaining being most sensitive to interference caused by previously assigned resource blocks;

assigning a next most favorite resource block to the most sensitive cell remaining, wherein the most sensitive cell remaining and the next most favorite resource block are determined by measurement of the network performance metric; and repeating the steps of determining the most sensitive cell remaining and assigning the next most favorite resource block until each of the plurality of cells has been assigned a resource block.

15. The method of claim 14, further comprising:

informing a plurality of base stations, each base station located in an associated cell of the plurality of cells; and configuring each base station to operate with the resource block assigned to the associated cell.

16. The method of claim 14, wherein a resource block comprises a frequency bandwidth, a time slot, or a power level of a signal.

17. The method of claim 14, wherein an effect of interference among adjacent cells with a same resource block assignment is reduced as measured by the network performance metric related to a number of resource block assignment conflicts over the plurality of cells.

18. The method of claim 14, wherein the network performance metric comprises a measurement of cell loading, cell edge loading, cell sizes, number of users, handover success rate, or user equipment (UE) signal to interference and noise ratio (SINR).

19. The method of claim 14, wherein the $A_{ij}^k$ is a relative measurement of a reference signal receive power (RSRP) caused by the assigned resource block of the cell j measured by a UE in the cell i, and $A_{ji}^k$ is a measurement of a RSRP caused by the assigned resource block of the cell i measured by a UE in the cell j.

20. An apparatus to manage resource allocation in a wireless network, the apparatus comprising:

a decision unit configured to receive notice of a network event and cause triggering of a coloring decision to assign a plurality of resource blocks to a plurality of cells within the network based on the network event;

an assignment unit configured to receive a network performance metric and perform a network coloring by assigning each cell among the plurality of cells an associated resource block, wherein an effect of interference among adjacent cells with a same resource block assignment is reduced measured by the network performance metric related to a number of resource block assignment conflicts over the plurality of cells; and a storage unit configured to store a network neighboring relation table (NRT) maintained for the network, and the network NRT comprising a matrix of size n*n, wherein n is a number of cells, wherein an element $B_{ij}$ of the matrix is $B_{ij}=A_{ij}+A_{ji}$, wherein $$A_{ij} = \frac{1}{N_i}\left(\sum_{k=1}^{N_i} A_{ij}^k\right)$$

is a first metric that indicates an interference from a cell j to a cell i, which is caused by an assigned resource block of the cell j measured by all UEs over a period of time $N_i$ at each time instant k in the cell i,
wherein $$A_{ji} = \frac{1}{N_j}\left(\sum_{k=1}^{N_j} A_{ji}^k\right)$$

is a second metric that indicates an interference from the cell i to the cell j, which is caused by an assigned resource block of the cell i measured by all UEs over a period of time $N_j$ at each time instant k in the cell j, and wherein $A_{ji}^k$ and $A_{ij}^k$ are each a relative measurement of an interference to a UE measured at time instant k.

21. The apparatus of claim 20, wherein the network event comprises a cell addition, a cell deletion, a network change, a frequency band change, a periodic trigger, or a change in the network performance metric.

22. The apparatus of claim 20, wherein the $A_{ij}^k$ is a relative measurement of a reference signal receive power (RSRP) caused by the assigned resource block of the cell j measured by a UE in the cell i, and $A_{ji}^k$ is a measurement of a RSRP caused by the assigned resource block of the cell i measured by a UE in the cell j.

23. The apparatus of claim 22, wherein the network NRT for the network is generated from a plurality of base station NRTs received from a plurality of base stations located in the plurality of cells, and a base station NRT for the base station located in the cell i is generated from a plurality of data $A_{ij}^k$ received from a plurality of UEs located in the cell i.

24. An apparatus located in a cell of a wireless network, comprising:

a collection unit configured to receive a plurality of data $A_{ij}^k$ by a plurality of User Equipments (UE) in the cell, wherein an $A_{ij}^k$ is a relative measurement of a reference signal receive power (RSRP) caused by an assigned resource block of an adjacent cell j measured by a UE in the cell, wherein the assigned resource block comprises a frequency bandwidth, a time slot, or a power level of a signal;

a storage unit configured to store a base station neighboring relation table (NRT) generated from the plurality of data $A_{ij}^k$, wherein the base station NRT comprises a matrix of size s*s, wherein s is a number of adjacent cells around the cell the apparatus is located, wherein an element $B_{ij}$ of the matrix is $B_{ij}=A_{ij}+A_{ji}$, wherein $$A_{ij} = \frac{1}{N_i}\left(\sum_{k=1}^{N_i} A_{ij}^k\right)$$

is a first metric that indicates an interference from a cell j to a cell i, which is caused by an assigned resource block of the cell j measured by all UEs over a period of time $N_i$ at each time instant k in the cell i,
wherein $$A_{ji} = \frac{1}{N_j}\left(\sum_{k=1}^{N_j} A_{ji}^k\right)$$

is a second metric that indicates an interference from the cell i to the cell j, which is caused by an assigned resource block of the cell i measured by all UEs over a period of time $N_j$ at each time instant k in the cell j, and wherein $A_{ji}^k$ and $A_{ij}^k$ are each a relative measurement of an interference to a UE measured at time instant k; and a reporting unit configured to report the base station NRT to a network management system.

25. The apparatus of claim 24, further comprising:
a receiver configured to receive an assigned resource block; and
a mode configuration unit configured to perform a configuration of the assigned resource block so that a UE can communicate with the apparatus using the assigned resource block.

26. The apparatus of claim 24, wherein the $A_{ij}^k$ is a relative measurement of a reference signal receive power (RSRP) caused by the assigned resource block of the cell j measured by a UE in the cell i, and $A_{ji}^k$ is a measurement of a RSRP caused by the assigned resource block of the cell i measured by a UE in a cell j.

* * * * *